United States Patent
Putnam et al.

(10) Patent No.: US 8,239,561 B2
(45) Date of Patent: *Aug. 7, 2012

(54) SYSTEM AND METHOD FOR LOCATING AND CAPTURING DESIRED MEDIA CONTENT FROM MEDIA BROADCASTS

(75) Inventors: William L. Putnam, Santa Cruz, CA (US); Richard E. Wolpert, Westlake Village, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,409

(22) Filed: Jun. 15, 2011

(65) Prior Publication Data

US 2011/0246649 A1 Oct. 6, 2011

Related U.S. Application Data

(63) Continuation of application No. 10/046,341, filed on Oct. 29, 2001, now Pat. No. 7,987,280.

(60) Provisional application No. 60/244,014, filed on Oct. 27, 2000.

(51) Int. Cl.
*G06F 15/16* (2006.01)

(52) U.S. Cl. ....................................................... 709/231
(58) Field of Classification Search .................. 709/231
See application file for complete search history.

(56) References Cited

U.S. PATENT DOCUMENTS

| | | | |
|---|---|---|---|
| 6,239,793 B1 * | 5/2001 | Barnert et al. ................ 709/231 |
| 6,377,995 B2 * | 4/2002 | Agraharam et al. .......... 709/231 |
| 6,931,451 B1 * | 8/2005 | Logan et al. ................... 709/231 |
| 2004/0199387 A1 * | 10/2004 | Wang et al. .................... 704/243 |
| 2004/0199654 A1 * | 10/2004 | Juszkiewicz .................. 709/231 |
| 2006/0136205 A1 * | 6/2006 | Song ............................. 704/243 |
| 2011/0160594 A1 * | 6/2011 | Platsch et al. ................. 600/473 |

* cited by examiner

*Primary Examiner* — Ajay Bhatia
(74) *Attorney, Agent, or Firm* — Æon Law; Adam L.K. Philipp

(57) ABSTRACT

A media agent that monitors multiple broadcast transmissions and a method for the same. The media agent establishes connections with broadcast transmissions and then identifies characteristics of the media content contained within the broadcast transmission. The association between the identified characteristic of the media content and the connected broadcast transmission is maintained to allow the information gathered from the broadcast transmission to be used meaningfully.

9 Claims, 11 Drawing Sheets

Architectural Overview of the Listener™ System.

SYSTEM AND METHOD FOR LOCATING AND CAPTURING DESIRED MEDIA CONTENT FROM MEDIA BROADCASTS

CROSS-REFERENCE TO RELATED APPLICATION

The present application is a continuation application of Ser. No. 10/046,341, now U.S. Pat. No. 7,987,280, "SYSTEM AND METHOD FOR LOCATING AND CAPTURING DESIRED MEDIA CONTENT FROM MEDIA BROADCASTS," naming William J. Putnam and Richard E. Wolpert as the inventors, filed Oct. 29, 2001; which application claims priority from U.S. Provisional Patent Application No. 60/244,014, "SYSTEM AND METHOD FOR LOCATING AND CAPTURING DESIRED MEDIA CONTENT FROM MEDIA BROADCASTS," filed Oct. 27, 2000. The present application claims the benefit of priority dates of the above-listed applications, the entireties of which are hereby incorporated by reference.

BACKGROUND OF THE INVENTION

1. Field of the Invention

The present invention relates to the enjoyment of media broadcasts. In particular, the present invention relates to a system that employs a combination of statistical prediction and real-time sensing to intelligently locate and capture desired media content from a plurality of broadcasts for private enjoyment by a user.

2. Description of Related Art

Technology advances have given home audiences access to an enormous number of broadcast media channels. Most home users now have access to hundreds of video broadcast channels through cable and satellite television systems. Home users with Internet capability have access to thousands of Internet audio broadcast channels. In many cases, users want to enjoy only a specific media element (such as a specific television show or audio track) but are unable to do so because the user is not available to view or listen to the media element at broadcast time or, in the case of audio tracks, the user does not even know when the desired audio track is scheduled to be played.

In accordance with a landmark decision by the U.S. Supreme Court, video recording devices have been permitted for enabling home users to "time-shift" (that is, record and subsequently view) their desired video broadcast. Most commonly, a user consults a published television schedule and manually programs their video cassette recorder (VCR) to record that program. Increasingly, digital "personal TV services," such as TiVo® from TiVo, Inc. of San Jose, Calif., have made video time-shifting easier for the home user. In particular, TiVo® allows the user to simply enter a specific show title after which the TiVo® device automatically accesses an electronic television schedule and programs itself to record that show for later viewing.

Unfortunately for the home audio user, TiVo®-like time-shifting of desired audio track transmissions is made difficult because radio stations, including Internet broadcasters, are prevented from pre-publishing their audio track play schedules. Additionally, the number and nature of Internet broadcasters continuously grows and varies, and many Internet broadcasters are "free-form" and would not have schedules to publish even if permissible. Thus, the capturing and enjoying of desired broadcast audio tracks has been difficult for the home user.

Several types of sites/services have emerged attempting to serve the needs of the person searching for audio content on the Internet, including community based file sharing services (e.g., Napster, Scour Exchange, and Gnutella), "personalized" broadcast services (e.g, launch.com, MongoMusic, and TuneTo), and commercial fee-based MP3 download sites. Companies such as Napster have created communities in which its user base can trade content between them. However, substantial legal problems exist with the Napster model, as users perform direct user-to-user copying as opposed to personal, single-user time-shifting of broadcast content. Aside from the legal problems that it is currently faced with, Napster has other problems as well, including a user interface that requires a labor-intensive user experience, as well as dependence on peer-to-peer trust as the sole means of ensuring adequate sound quality and search accuracy.

Personalized broadcast services such as launch.com typically learn about the musical tastes of a listener through a series of questions, and then offer a custom radio station based on the user's profile. However, while these services can "steer" the user to certain channels they may like, they cannot directly satisfy content-based requests from the user. Moreover, even if they could perform such content-based functionality, there are strict restrictions on broadcasting would that prohibit the stations from such direct "music on demand" type of activity. This inherently limits the effectiveness of services such as launch.com which promise radio broadcasts tailored to an individual's personal tastes.

Accordingly, it would be desirable to provide an automated system for locating and capturing media content from broadcast stations for subsequent and/or simultaneous private enjoyment.

It would be further desirable to provide such system for locating and capturing media content from broadcast stations even where the broadcast stations do not make their broadcast schedules available to the public.

It would be still further desirable to provide such system for locating and capturing media content from broadcast stations that may be flexibly adapted to conform to changes in the copyright laws related to time-shifting.

It would be even further desirable to provide such system for locating and capturing media content from broadcast stations that provides consistent media quality.

It would be still further desirable to provide such system for locating and capturing media content from broadcast stations that may be easily adapted for wireless implementation, and/or that may be easily adapted for wireless cooperation with a variety of other information appliances.

It would be still further desirable to provide such system for locating and capturing media content from broadcast stations that provides a straightforward, "non-techie" user experience.

SUMMARY OF THE INVENTION

The present invention provides a system and method for monitoring multiple broadcast transmissions. Each broadcast transmission, such as radio waves broadcast from a radio tower or streaming audio data transmitted over the Internet, contains media content. It is often useful to identify characteristics of the media content, which can be used to classify the content (e.g., a local traffic report, types of music or a particular artist, programs that have a favorite celebrity as a guest, etc.).

The method for monitoring multiple broadcast transmissions has several steps. One step is to identify the broadcast transmissions to be monitored. Another step is to establish connections with each of the identified broadcast transmissions. Yet another step is to identify at least one characteristic of the media content associated with the connected broadcast transmission for each connected broadcast transmission. Another step maintains the association between the identified characteristic of the media content and the connected broadcast transmission.

The media agent, which is the system for monitoring multiple broadcast transmissions, includes a user interface, a network interface, a media decoder, and a monitoring module. The user interface is for a user to identify, either directly or indirectly, a plurality of broadcast transmissions. The network interface is for receiving the plurality of identified broadcast transmissions from a network. The media decoder is for decoding each broadcast transmission received from the network. The monitoring module is for identifying at least one characteristic of the decoded media content.

DETAILED DESCRIPTION OF THE INVENTION

Figure 1:
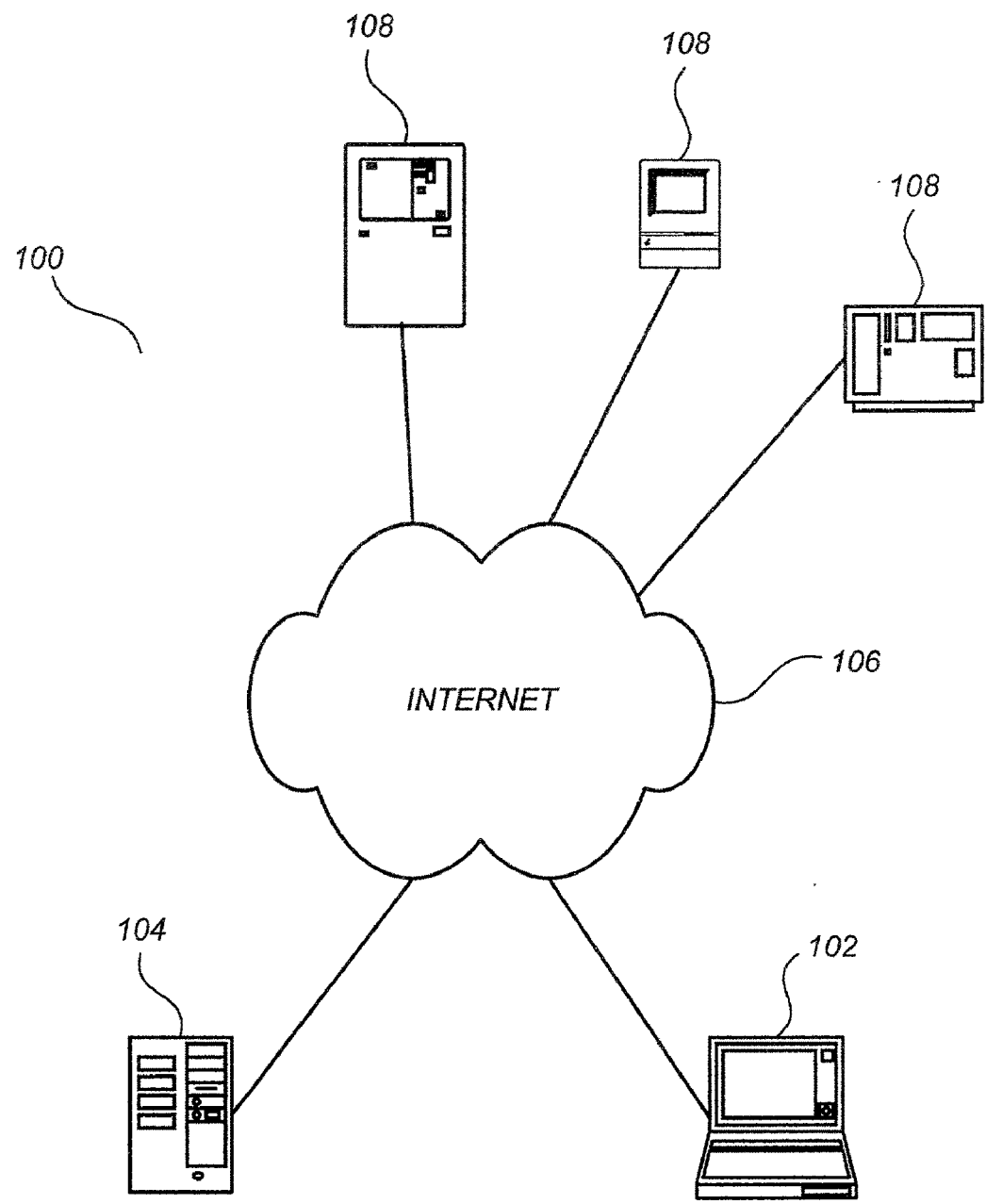
FIG. 1 shows a system for locating and capturing media content from broadcast stations in accordance with a preferred embodiment.

FIG. 1 shows a system 100 for locating and capturing media content from broadcast stations in accordance with a preferred embodiment. System 100 comprises a personal media agent 102 and a central media advisor server 104, each coupled to the Internet 106. System 100 further comprises a plurality of broadcast stations 108 also coupled to the Internet 106. Although the broadcast stations 108 of FIG. 1 are Internet 20 broadcast stations that broadcast audio data across the Internet, they may generally be any type of broadcast station, including conventional radio stations, or conventional television stations, in which case connections between the broadcast stations 108 and the Internet are not required.

Personal media agent 102 is generally a personal computer loaded with software programs designed to carry out the functionalities described herein. However, although realized within a personal computer in the example of FIG. 1, personal media agent 102 may be realized in any of a variety of information processing devices such as personal digital assistants (PDAs), home stereos or televisions, portable telephone devices, portable music devices, dedicated single purpose music appliances, or other information appliances. Preferably, personal media agent 102 is coupled to the Internet using a high-speed Internet connection, such as a DSL, cable modem, T1, or faster connection. Although shown as a wired Internet connection in FIG. 1, a wireless Internet connection may also be used, and in many cases is preferable. In one embodiment, personal media agent 102 is a Windows 98 computer loaded with a software package, called the Listener™ available from Audio Mill, Inc. of Santa Cruz, Calif. that performs functionalities described herein. Although currently available Listener™ software was written in C++ for the Windows platform, a person skilled in the art could readily implement, given the present disclosure, similar software for any of a variety of platforms in any of a variety of programming languages.

Central media advisor server 104 is preferably connected to the Internet using a very high-speed connection such as T3 or above, because one central media advisor server is used to serve many personal media agents 102. Although central media advisor server 104 is shown as a single unit in FIG. 1, it may actually comprise a plurality of servers coupled to the Internet for increased bandwidth purposes. Central media advisor server 104 is usually located at the site of a dedicated provider of central media advisor services, such as Audio Mill, Inc., supra. A currently available central media advisor server 104 is implemented on a high-speed computing system and uses an SQL database, with C++ and ASP (Active Server Pages) scripts for transactions with personal media agents 102. However, a person skilled in the art could readily implement, given the present disclosure, similar systems for any of a variety of platforms in any of a variety of programming languages.

Figure 2:
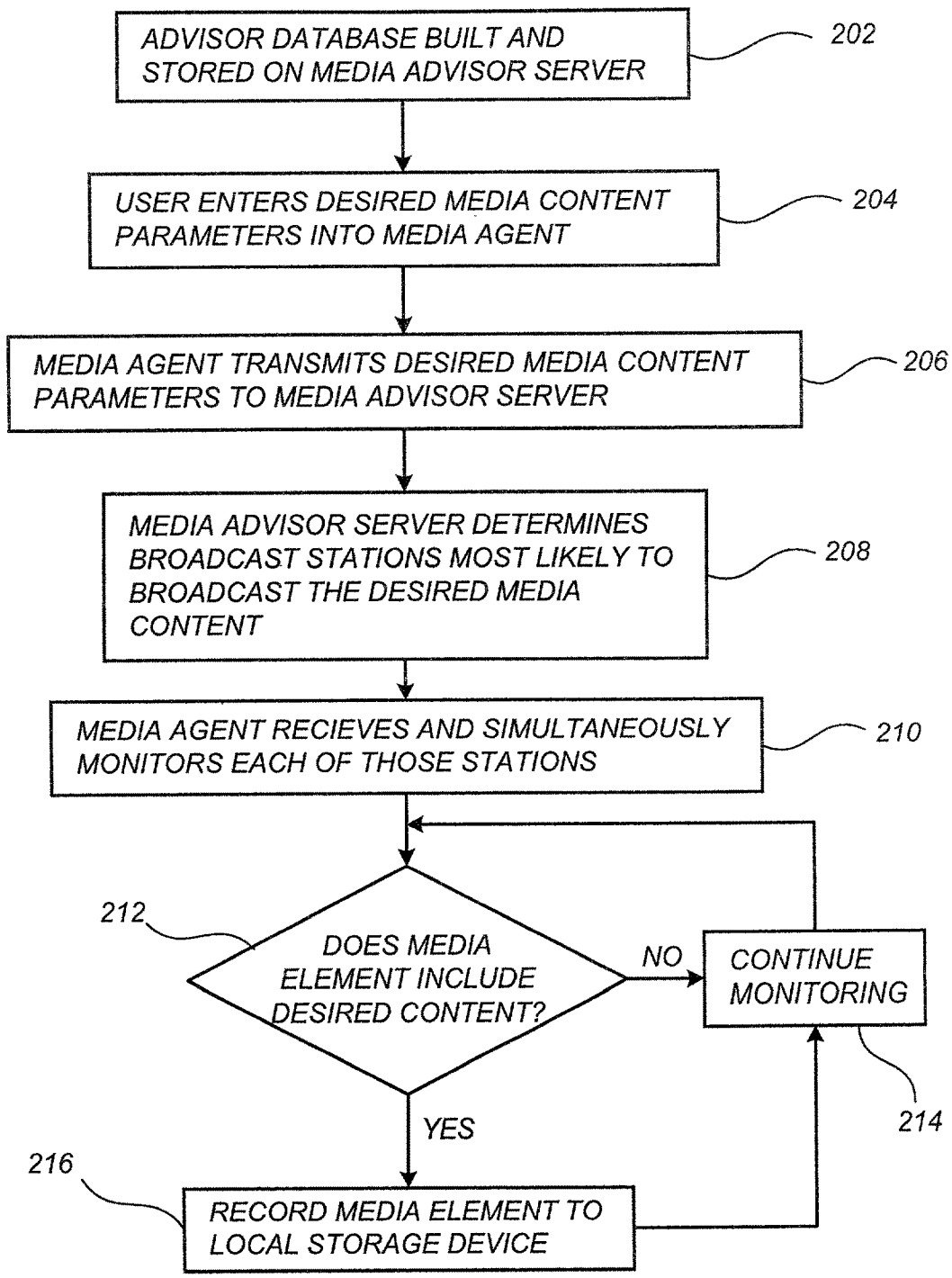
FIG. 2 shows steps taken by the system of FIG. 1.

FIG. 2 shows steps carried out by personal media agent 102 and media advisor server 104 in accordance with a preferred embodiment. At step 202 media advisor server 104 builds and stores an advisor database to be used for processing requests by personal media agents. Over a period of days or weeks, media advisor server 104 monitors all Internet broadcast stations and keeps a history of audio tracks played for each station, as well as other characteristics such as the artist, a predefined genre of the song, year of the song, the music album the song was from, etc. Using any of a variety of known statistical techniques, an advisor database is built that is able to map any desired song title, genre, artist, music album, etc., into a set of Internet broadcast stations most likely to transmit that content. In a preferred embodiment only those Internet broadcast stations known to provide high-quality music content and speedy delivery times are monitored for inclusion into the advisor database. One current example of such an Internet broadcast station is spinner.com, which is a web site that provides 153 different radio channels each focusing on a specific genre music. The process of selecting those Internet broadcast stations having high-quality music content and speedy delivery times would be carried out by industry professionals, or alternatively could be, based on surveys or other information. Importantly, although an Internet audio embodiment is currently being described, any type of information content including analog or digital television broadcasts, analog or digital radio broadcasts, small portions of these television or radio broadcasts, software, games, data broadcast transmissions, and in general any type of broadcast transmissions may be captured in accordance with the preferred embodiments.

There are several manners in which the central media advisor server 104 can detect and classify Internet music broadcasts in accordance with the preferred embodiments. In one embodiment, side-chain or meta-data is used that is present in a number of Internet audio broadcasts. For example, formats such as Real Networks G2 format, the Windows Media format and MP3 (as streamed by Shoutcast) all provide for the possibility of including data which specifies the streaming content. In an alternative embodiment, pattern recognition techniques are used to identify the specific song. The streamed data is matched against template data for the songs that are being sought. This template data could reside either in a centralized server, or local to the software application/device.

Another method is to employ a central service that manually monitors a number of stations. This service would monitor a number of stations and provide the pertinent information for the content that it is monitoring. In the case of music, this could be the artist, the song, the genre or the album that it comes from. In the case of other types of content, it could be more general descriptive information of any sort. Another method is to centralize information from other sources such as the actual broadcasters web pages.

Figure 3:
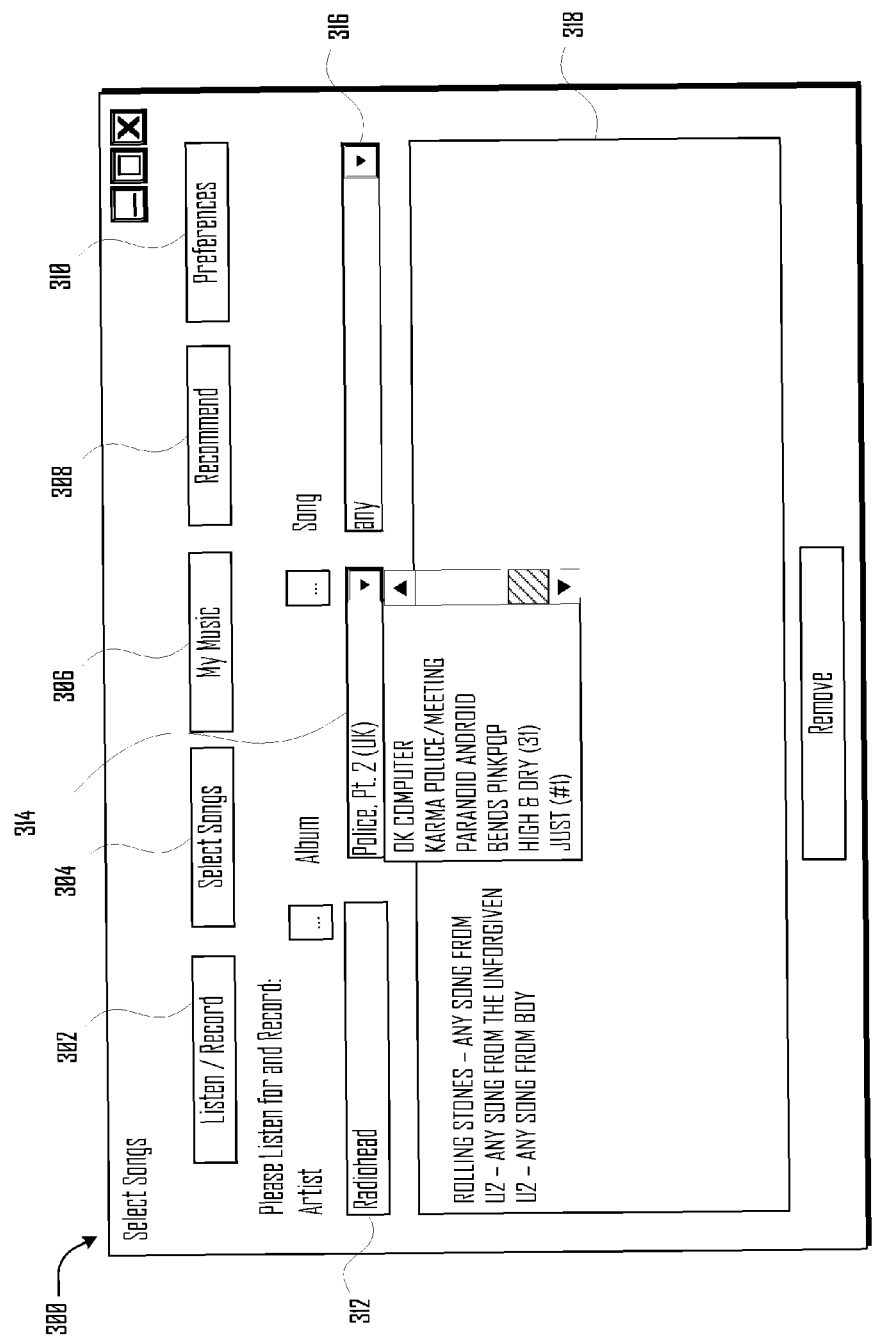
FIG. 3 shows a song selection screen of a personal media agent in accordance with a preferred embodiment.

FIG. 3 shows a song selection screen 300 in accordance with a preferred embodiment. At step 204 the user invokes personal media agent 102 and enters the desired media content using the simple, user-friendly interface of song selection screen 300. Song selection screen 300 comprises a listen/record button 302, a select songs button 304, a my music button 306, a recommend button 308, and a preferences button 310. Buttons 302-310 generally appear in the same place on all user screens of the personal media agent 102, with the identified screen being invoked upon clicking of that button. Song selection screen 300 further comprises and artist entry box 312, in album box 314, case song box 316, and a selection summary box 318 as shown in FIG. 3.

Advantageously, song selection screen 300 represents an intelligent interface that makes the process of identifying desired artist, albums, and songs as simple as possible for the user. For example, when the user enters a desired artist in the artist entry box 312, the personal media agent 102 will automatically query the central media advisor server 104 for all albums relevant to that artist, which then appear in a pull-down box off album box 314, which simplifies the process for user. Additionally, algorithms or techniques such as 'artificial intelligence' could be used to capture/record content based on the users tastes. This can be determined by asking a number of questions from the user, or by making assumptions based on material the user has already requested/collected.

Subsequent to the user's entry of desired media content parameters at step 204 at step 206 the personal media agent 102 transmits the desired media content parameters to the central media advisor server 104. At step 208 the central media advisor server 104 determines those Internet broadcast stations that are most likely to broadcast the desired media content and transmits the identities of those broadcast stations to personal media agent 102. At step 210 personal media agent 102 receives and simultaneously monitors each of those Internet broadcast stations.

Figure 4:
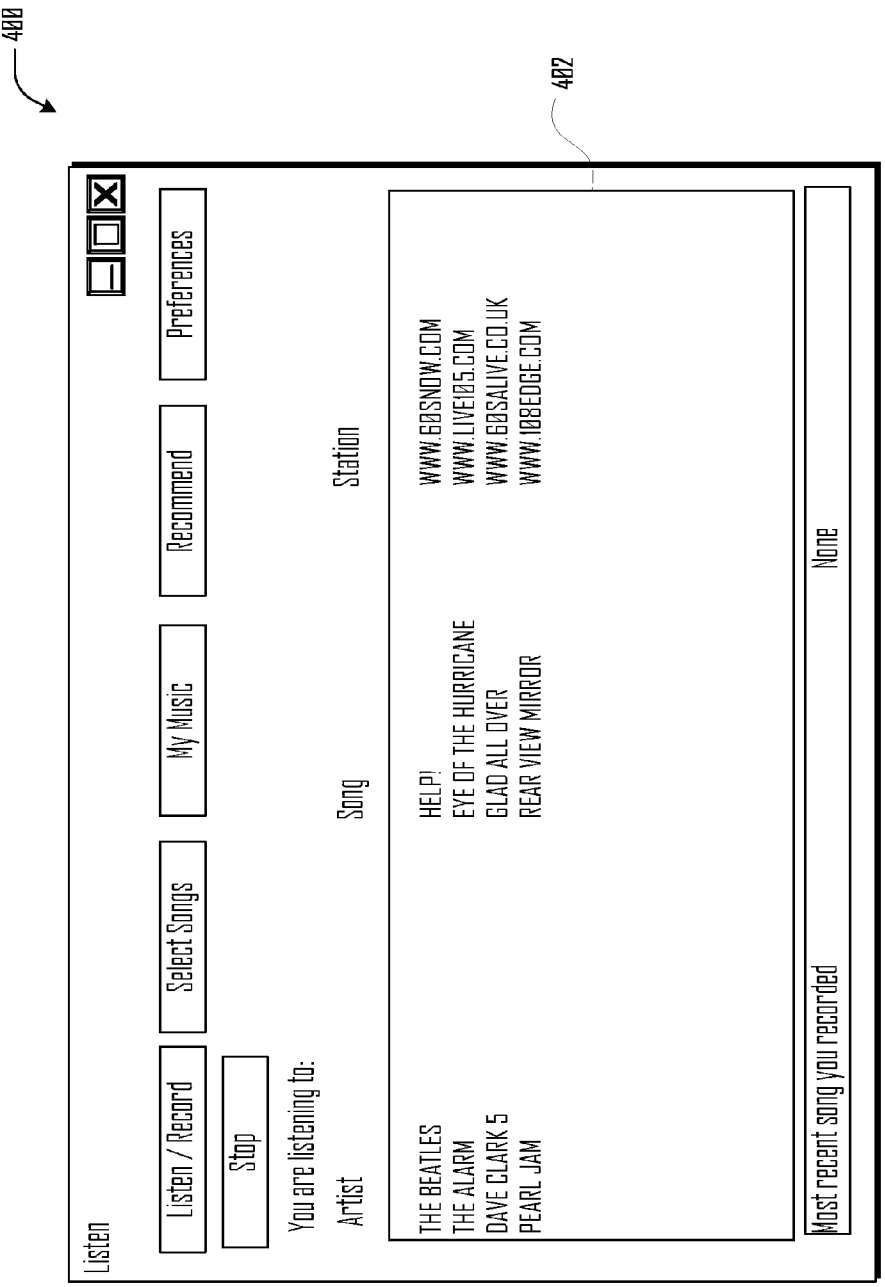
FIG. 4 shows a listen/record screen of a personal media agent in accordance with a preferred embodiment.

FIG. 4 shows a listen/record screen 400 in accordance with a preferred embodiment. In addition to buttons 302-310 described supra (and not labeled in FIG. 4), listen/record screen 400 provides a monitoring summary screen 402 that identifies to the user which Internet broadcast stations are being monitored. At step 212 of FIG. 2 the personal media agent 102 determines whether any of the media elements being played matched the desired media content parameters. The method or methods used by the personal media agent 102 to detect the songs being played and their characteristics are similar to those described supra with respect to step 202, carried out by the central media advisor server 104. If no desired media element is being played by those stations, monitoring continues at step 214. If, on the other hand, it is determined that a desired media element is being played, then at step 216 that media element is recorded to a local storage device by the personal media agent 102. Optionally, the user may be notified by an audible alarm if the user is present, or by an alphanumeric page or even telephone call if the user is not present.

Figure 5:
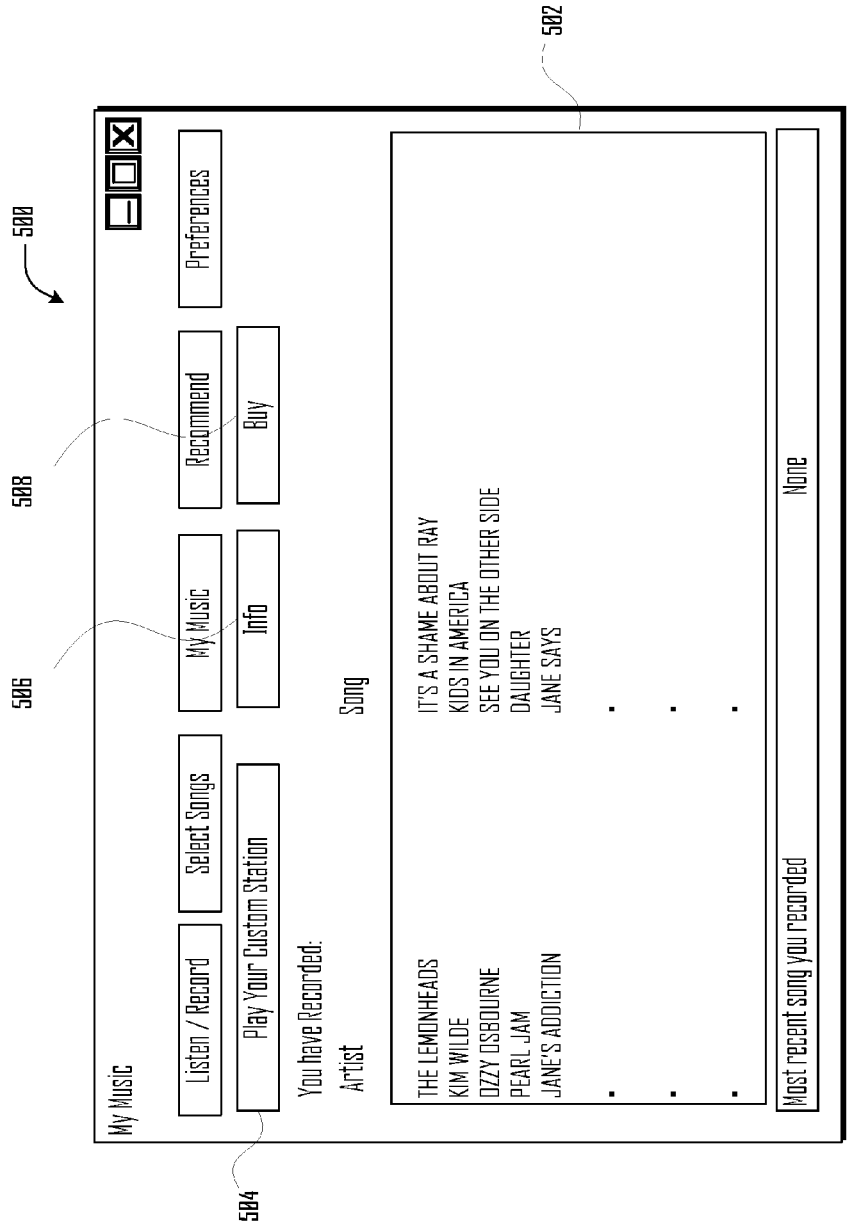
FIG. 5 shows a my music screen of a personal media agent in accordance with a preferred embodiment.

FIG. 5 shows a my music screen 500 in accordance with a preferred embodiment. In addition to buttons 302-310 described supra (and not labeled in FIG. 5), my music screen 500 comprises an inventory summary screen 502, a play your custom station button 504, an information button 506, and a buy button 508. By pressing button 504, the user may instantiate the random or sequential playing of the songs that have been recorded. The information button 506 and buy button 508 achieve a novel method of doing business in accordance with a preferred embodiment, wherein a third party music vendor may contract with the provider of the personal media agent 102 to be a sole vendor for providing information on the recorded tracks and for being an online music store for those users desiring to purchase the selected music. In the simplest embodiment, buy button 508 is a hypertext link to the web page of the third party music vendor comprising the identity of the song that is currently selected on the inventory summary screen 502.

Figure 6:
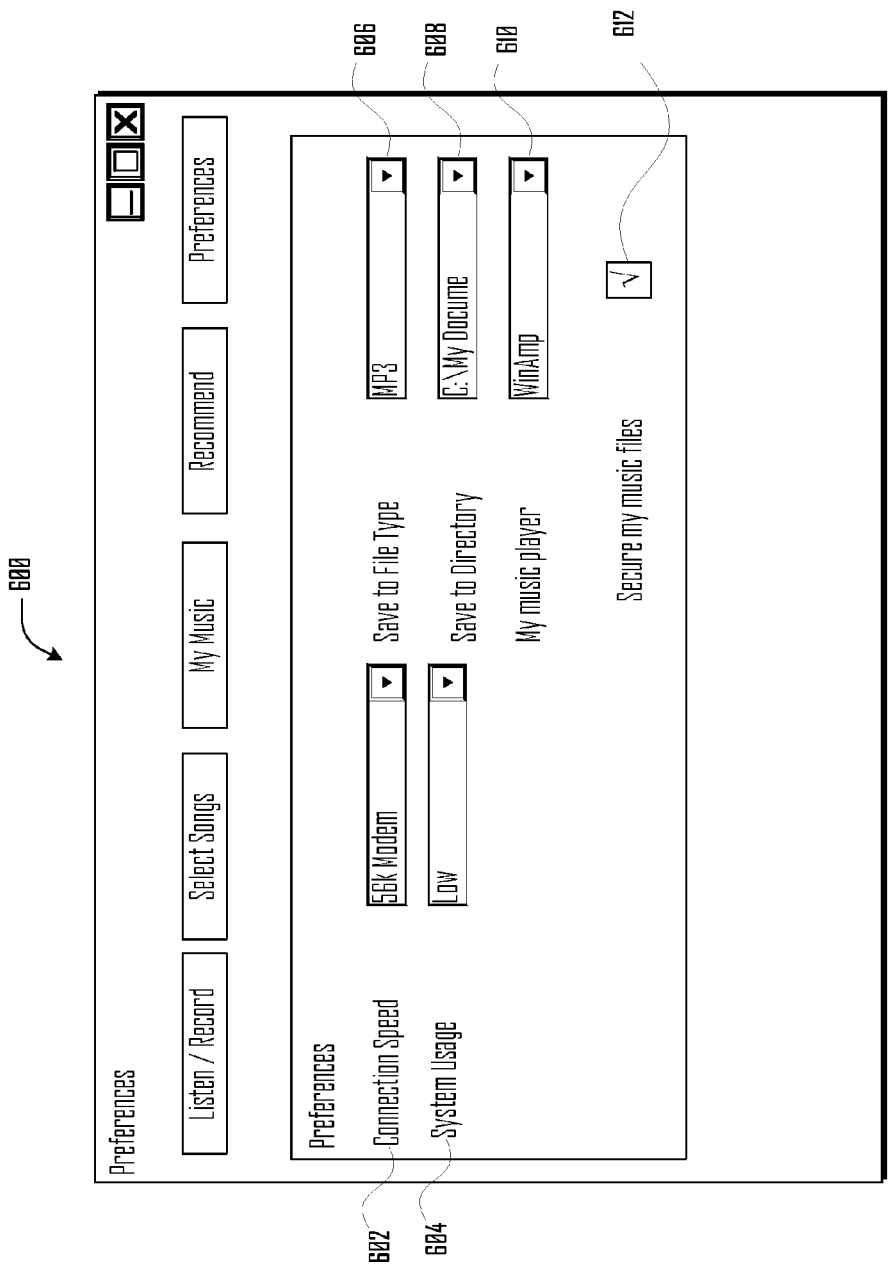
FIG. 6 shows a preferences screen of a personal media agent in accordance with a preferred embodiment.

FIG. 6 shows a preferences screen 600 in accordance with a preferred embodiment. In addition to buttons 302-310 described supra (and not labeled in FIG. 6), preferences screen 600 comprises a connection speed box 602, a desired system usage level box 604, a file type box 606, a target directory box 608, a music player type box 610, and a security check box 612, each having the functionally indicated thereon. In accordance with a preferred embodiments, the personal media agent 102 does not include music player software, but rather links to know, off-the-shelf music players such as WinAmp, Real Player jukebox, or other player software.

Security check box 612 is associated with the invocation of licensing/encryption features in accordance with a preferred embodiment. In particular, certain released versions of personal media agent 102 may come with security check box 612 permanently "on," whereby prior to storage the downloaded music files would be encrypted such that they could not be played back unless appropriate license fees were paid by the user and unlocking codes provided. Accordingly, in the event that copyright laws are modified to preclude time-shifting of broadcast audio content for personal use, a version of the personal media agent 102 may be released that is in accordance with the new copyright laws. A variety of digital music encryption and enforcement mechanisms may be used in accordance with the preferred embodiments, such as the "DigiBox" standard from Intertrust Communications, Inc. of Santa Clara, Calif.

Figure 7:
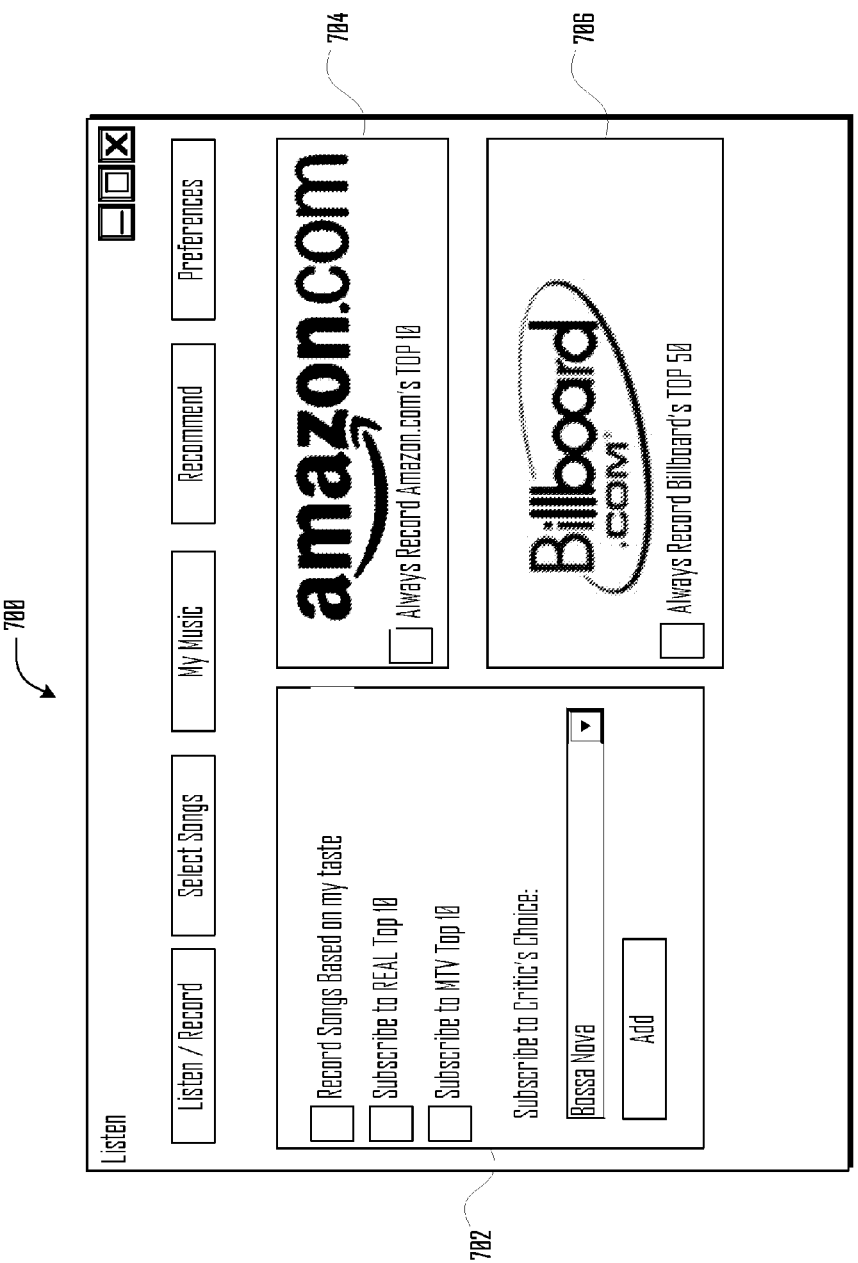
FIG. 7 shows a recommendations screen of a personal media agent in accordance with a preferred embodiment.

FIG. 7 shows a recommendations screen 700 in accordance with a preferred embodiment. Recommendations screen 700 represents a plurality of novel business methods that may be employed by the provider of the personal media agent 102 to derive revenue therefrom. For example, a recommendation box 702 is provided that allows users to subscribe to certain audio sources, with each subscribing user resulting in fees paid from those audio sources to the provider of the personal media agent 102. Additionally, advertising boxes 704 and 706 may be dynamically updated through communication between the central media advisor server 104 and the personal media agent 102, and revenue may be derived by the provider of the personal media agent 102 on a fixed fee basis, on a click-through revenue model, or other revenue model.

Figure 8:
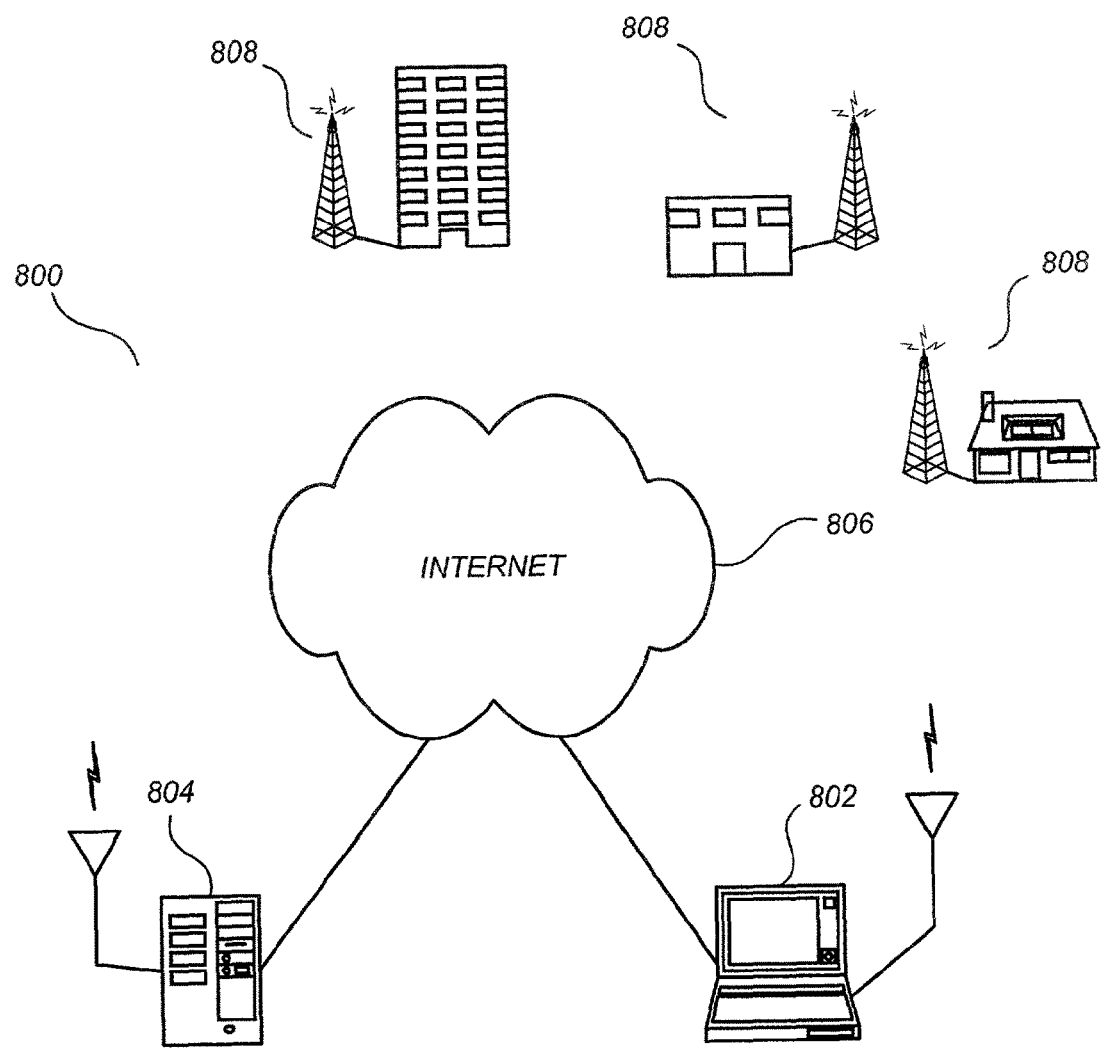
FIG. 8 shows a system for locating and capturing media content from broadcast stations in accordance with a preferred embodiment.

FIG. 8 shows a system 800 for locating and capturing media content from broadcast stations in accordance with a preferred embodiment, wherein conventional broadcasts such as FM radio broadcasts may be captured and subsequently enjoyed by the user. System 800 comprises a personal media agent 802 and central media advisor server 804, each coupled to the Internet 806 and being similar to like elements of FIG. 1, supra. However, the personal media agent 802 and central media advisor server 804 are each capable of receiving FM radio broadcasts from a plurality of FM radio stations 808.

Figure 9:
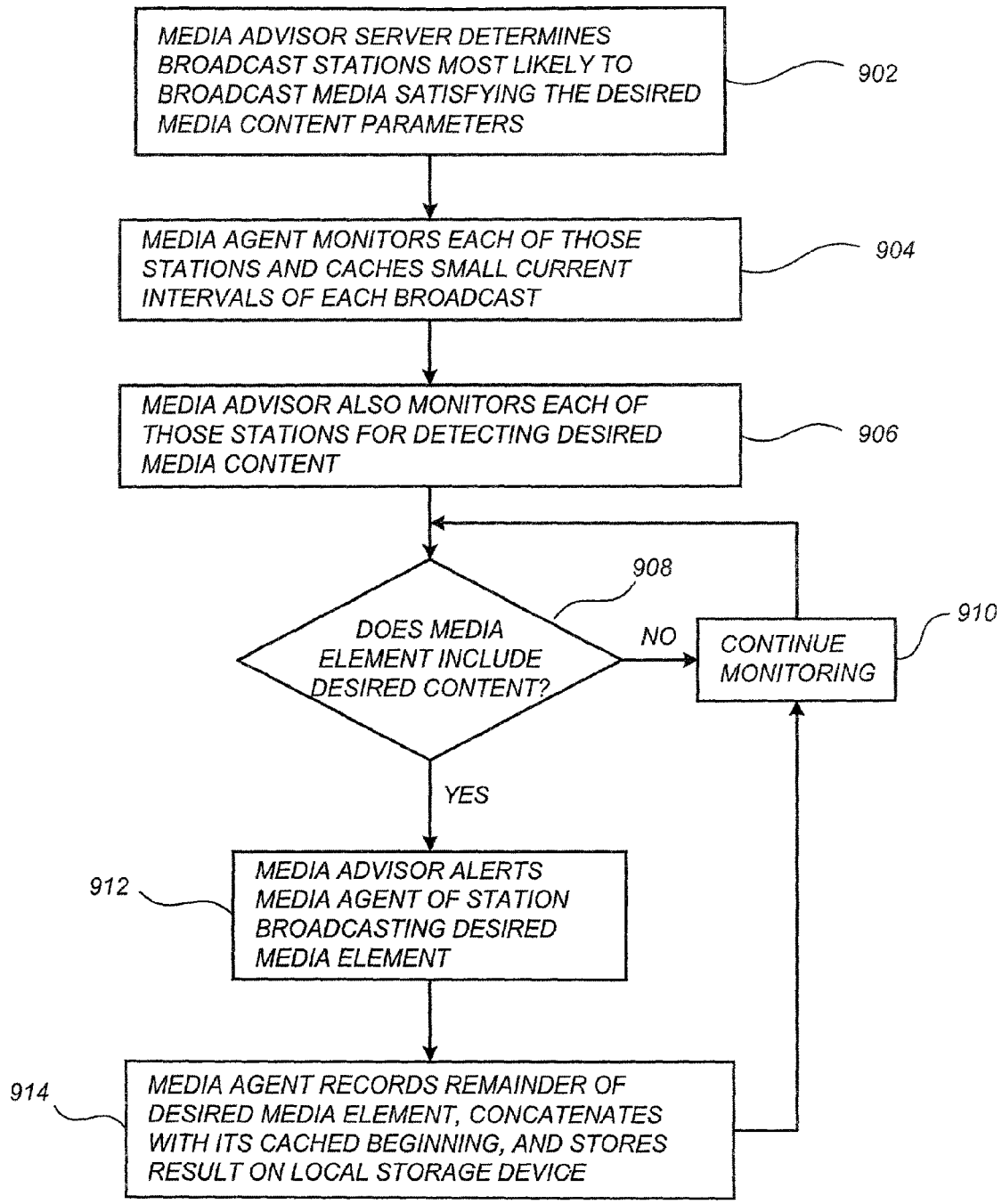
FIG. 9 shows steps taken by the system of FIG. 8.

FIG. 9 shows steps taken by personal media agent 802 and central media advisor server 804 in accordance with a preferred embodiment. At step 902, which is carried out subsequent to steps similar to steps 202-204 of FIG. 2, central media to advisor server 804 determines those broadcast stations that are most likely to broadcast media satisfying the desired media content parameters. At step 904 personal media agent 802 monitors each of those stations, while buffering small current intervals of each station being monitored (e.g., the most recent 60 seconds). At step 906 the media advisor server 804 also monitors each of those stations for detecting the desired media content. The detection of the desired media content is generally carried out in a manner similar to that described supra with respect to FIG. 2. At step 908 it is determined whether the detected media content satisfies the desired media content parameters, and if not, monitoring is continued at step 910. However, if it is determined that desired media content is being broadcast, media advisor server 804 immediately sends an alert to the media agent 802, advising it of which station is broadcasting a desired media element. At step 914 the personal media agent 802 records the remainder of the desired media element and then, because it did not catch the first part of that media element, concatenates the appropriate buffered content with the recorded content to produce the complete media element. The length of buffering done at personal media agent 802 may be vary depending on the recognition and response time of media advisor server 804 in recognizing the desired media broadcast.

Figure 10:
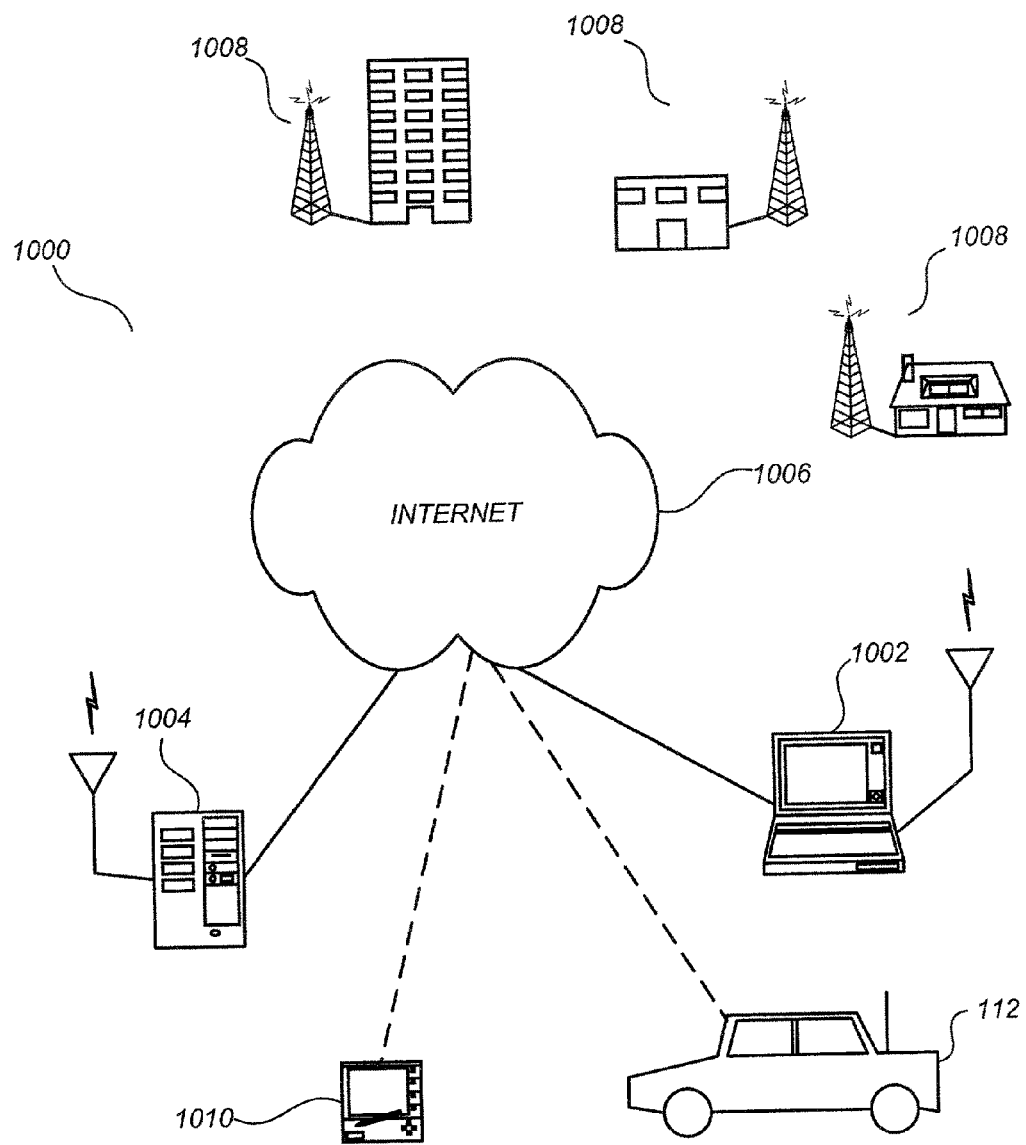
FIG. 10 shows a system for locating and capturing media content from broadcast stations in accordance with a preferred embodiment.

FIG. 10 shows a system 1000 for locating and capturing media content from broadcast stations in accordance with a preferred embodiment, in which the user may personally activate the personal media agent from a remote location. System 1000 comprises elements and 1002-1008 similar to elements 802-808 of FIG. 8, respectively, and further comprises a mobile computing device 1010, such as a PDA, and an automobile 1012 also containing a computing device. In accordance with a preferred embodiment, PDA 1010 and automobile 1012 are loaded with remote wireless agent communications software that is adapted to communicate with personal media advisor 1002 via wireless connections to the Internet 1006. In one scenario of the system of FIG. 10, the user is walking down the street with their FM Walkman on and hears an audio track they would like to record. The user activates the remote wireless agent communications software on PDA 1010 and instructs the personal media agent 1002 to record the song currently being enjoyed on the FM Walkman. The personal media agent 1002 proceeds to record that song for subsequent enjoyment by the user. A similar scenario may take place with automobile 1012 also equipped with the remote wireless agent communications software, or any other fixed or mobile computing device having Internet access and the remote agent communications software.

While recording, personal media agent 1002 communicates with central media advisor server 1004 to notify it of the song being recorded. The central media advisor server 1004, which has been keeping a current buffer (e.g., the latest 60 seconds worth) of each of the FM radio stations being broadcast in that locality, then transmits the appropriate buffered song portion to the personal media agent 1002, which then concatenates the buffered portion with the recorded portion to produce the complete recorded song.

In an alternative embodiment, each of the PDA 1010 and automobile 1012 may be completely outfitted with a complete personal media agent, including the ability to store media elements. The various personal media agents belonging to a common user may cooperatively communicate to keep each other up to date with the user's latest preferences. Optionally, the various personal media agents may download recorded media elements to each other so the user may have a complete, up to date music collection on each of the various information devices.

Additional disclosure in relation to the preferred embodiments is now presented.

Future Publication of Audio Broadcast Schedules. Currently, audio track schedules are not published. It is conceivable, that they might be published at some point in the future. This would open the possibility for a device which would capture music that was broadcast over the Internet or traditional AM/FM and record content based on these schedules. Alternatively, time schedules for specific content could be provided. For example, if one owned the rights to some content, one could publish the time/station on which it would be played. This could then be used to automatically, and directly program a device to record this content. It is foreseeable that this could be used for promotions. For example a single song from an album could be broadcast in this fashion.

Using servers as proxies with built in delay. Another method to record personalized content is to employ a server that monitors a large number of broadcasters. This server would buffer the data and serve as a proxy, and hence rebroadcast each of the streams that it was monitoring. Once this data is rebroadcast with a suitable delay, there are several options for system architectures which support personalized content recording. One is for the server to alert or notify client applications/devices when content that they requested is being broadcast. The server could do this immediately, when the content is first recognized. The client could then 'tune' to the appropriate station. The delay that is established by the server makes this method possible. An alternative architecture is to have the client applications/devices 'poll' the server for up-to-date information on the content. The server provides real-time information regarding the specifics of the content that it is monitoring. When the client recognizes content that it wants, it starts recording.

Using servers to monitor/record and deliver content. Another method is to utilize servers that do all the monitoring and recording. Clients can request content from the server. When the server finds content that one of its clients has requested, it records the content. This content can then be delivered to the client using any of a number of established Internet protocols.

Automatically determining the end/beginning of a song. In many cases, Internet broadcasters provide clear demarcations as to where a song transition takes place. This allows the agents to determine when to start/stop recording. In cases where the transitions are not obvious, other signal processing techniques can be employed. In one technique, the level of the audio can be monitored using an energy detector. When this falls below a threshold, a transition is assumed to take place (much like track-splitting in Easy CD Creator). Also, computation auditory scene analysis ("CASA") methods can be employed to determine when a transition is made between songs. Typical methods would observe the rhythm, tempo, and other characteristics of the music. When these change drastically, it can be assumed that a song transition has taken place. This becomes more robust when coupled with the level detection technique.

Traditional Radio Broadcast (AM/FM). The majority of the techniques/technologies that were discussed above apply to traditional broadcast such as AM and FM. For example, with the addition of an FM tuner card, a computer is enabled to execute a number of the techniques mentioned above. The computer would communicate with a central server/service where realtime information would be provided on the specific description of the content. In a similar manner to techniques presented above, the client would record content that met its specific criteria. This technology could be either be built into an FM/AM radio, or a radio could be added to any computing device such as a computer or portable device. This could either be a home, portable or car radio. The radio could communicate to the server using any Internet access technique. Examples include home modem, LAN or wireless modem. Multiple tuners, or a single tuner capable of monitoring multiple stations, could be used to allow the 'media agent' to monitor/capture multiple stations at the same time. This idea could also be extended to a service which monitors a large number of stations, recording content that clients have requested. The service would then transfer the content to the clients.

Applications. The above techniques are applicable to non-music audio. Specific examples of where this is particularly useful is talk radio, sport broadcasts, and interviews. The above discussion applies to video content as well.

Commerce/Security Models. Several models can be employed to provide a commerce opportunity. Once the content is found, it can be 'locked' to the machine or device which recorded it. The user could then purchase the rights, or a license to have more complete access to the content. Additionally, the user can be given limited access to the content. This can take the form of a limited number of playbacks (listening or viewing) or a fixed time period. Similarly, the user can be offered an easy way to purchase the content, or extend their time period (either more playback instances or a longer time period). The consumer can be offered a simple way of purchasing the content. If the 'media agent' was embodied as a software application, a 'hyperlink' would allow the user to 'click' or 'double-click' on a link to immediately purchase the content. All pertinent commerce information (such as credit card/mailing address) could be previously stored when the consumer either purchased or registered the product/software.

Determining the Characteristics of the Broadcast Content. One of the primary challenges in implementing 'media agents' which automatically record content specified by the user is for the agent to be able to determine whether or not it needs to record the content. Specifically, the agent needs to learn the specifics of the content. In the case of music, the device/application needs to learn the name of the song, artist album, or the genre(s) of music that the song belongs to. In the case of non-music audio, the information could be any of a number of things such as the name of the program, the name of the individuals appearing in the program, the subject matter. Essentially, any relevant piece of information that describes the content. Video has similar descriptive requirements. There are several manners in which a device/application can determine the specifics of the content that it found.

One possibility is to use the side-chain or meta-data that is present in a number of Internet audio broadcasts. For example, formats such as Real Networks G2 format, the Windows Media format and MP3 (as streamed by Shoutcast) all provide for the possibility of including data which specifies the streaming content. This also applies to video applications as well. Side-chain data is not limited to Internet based media. These same principles could be applied to other broadcast media as well using the specific side-channels present. For example, the possibility exists for FM broadcasters to broadcast an out of band data signal. Another example is using the Vertical blanking interval in television to send the content description information.

Both of the examples presented in the preceding paragraph use systems where the descriptive data is contained in an out of band signal connected to the main content broadcast. Another alternative is to provide a 'simulcast' using another mode of communication. For example, an Internet server could broadcast or send a text description of any other broadcast media (music, audio, video, television on Internet or traditional broadcast). This simulcast descriptive data could be utilized by an agent to make decisions regarding the recording of the content.

Another method is to use pattern recognition techniques to identify the specific song. The streamed data could be matched against template data for the songs that are being sought. This template data could reside either in a centralized server, or local to the software application/device. Pattern/speech recognition could also be used in other broadcast media (video, non-music audio, television, etc.) to monitor for key words that an agent is looking for.

Another method is to use a central service which monitors a number of stations. This service would monitor a number of stations and provide the pertinent information for the content that it is monitoring. A number of techniques could be used in tandem to obtain this information. One is for people to actually monitor the broadcast and create information that describes the content. In the case of music, this could be the artist, the song, the genre or the album that it comes from. In the case of other types of content, it could be more general descriptive information of any sort. Another method is to use information that might be provided by the broadcaster on a web page. Another method is to centralize information from other sources such as the actual broadcasters web pages. Once this descriptive data is established, the client application or device could communicate with the server to access the data. This data would then be used by the client to determine if it should record (or keep the content if it is buffering) the content.

Automatic Generation of Metadata. Most of the technology presented requires the existence of some type of metadata. As mentioned previously, this metadata can be broadcast in a number of different fashions. Speech recognition can be used to monitor the audio of a broadcast stream and look for keywords. When one of these keywords is found it is then inserted into the metadata stream. The keywords are contained in a dictionary. This dictionary could either be static, or be dynamically created from the body of words/subjects that the client 'agents' have requested. This creates a system, where the users requests could be used to determine the keywords that are tagged within the broadcast stream. This technique applies to all types of broadcast media including non-music audio, television, and video.

Criteria for Capturing/Recording Content. There are a number of options for the type of criteria that can be used to describe the content that is desired to a 'media agent.' For music, content can be selectively recorded based on song title, artist name, album name, genre, or other classification. Additionally, if the user so specifies, the agent can make 'recommendations.' This is essentially using the user's profile to automatically record content that user might not have specifically requested. The users profiles can be based on the following information, as well as other information including, but not limited to: what type of music/content they have already requested; similar artists can be recommended/recorded; what type of music/content they have purchased; what styles of music they like; personal information such as sex, age, and/or other information. The users profile information could also be used for other entities, such as human experts or companies to make recommendations, or instruct the agent to record certain content.

Playlists and Community Based Sharing/Recommendations. Users can create playlists which can then be transmitted and used by other people in a community such as their friends, members of a club, users with similar taste, etc. Playlists are descriptions of content. In the case of music they could be a list of specific songs, artists or albums. These playlists could then be shared with friends. When this is done, a person could send a list of things for their friends agent to find. In this way, people could share music with friends. Playlists could be emailed from one person to another person. The recipient would then load the playlist into their agent. Alternatively, playlists could be handled through a central server. The sender sends the playlist to the server, and includes the destination address or identifier for the intended recipient. The server would then notify (alternatively the recipients agent could be polling the server) the recipients agent. The recipients agent would then load the playlist and start the search for that content. In the case of a software application, the sender could send the application as well as the playlist to a recipient. This would be appropriate when the recipient did not already have the software application. Alternatively, the sender could send the playlist and a link to where the recipient could download the application. Alternatively the sender could send (via email) the playlist and a very small application that automatically downloads the agent software application.

This could support a business/marketing model where if someone got a certain number of their friends to download the application, you could reward them in some fashion such as giving them a free copy of an enhanced version of the application. These techniques could also form the basis of dynamic preference communities where users agents could respond to those in a community of other users with similar tastes.

Distributed Agent Architectures. The above concepts can be generalized to support a network of media agents working together to gather and record content. For example, an individual could have software agents running on their home computer, work computer and school computer. These agents could either co-ordinate their efforts by directly communicating with each other or by communicating through a central server or by an architecture in which a server controls each of the agents. This can be extended to any number of agents for all types of media.

Control of Agents. Agents can be controlled directly of remotely through a number of means. Examples include: control of agent(s) through a web page, the web page being on a central server or on a home server; control through a cellular phone via Internet connection or via touch-tone services; control through an Internet appliance; control through PDA style devices; control through displays at a point-of-sale; devices built into a car; or devices built into a home/car stereo. An example would be a situation in which someone is in a car and they hear a song that they like on the radio. They could use their portable device (phone, PDA, etc.) to add this song/artist/album to their desired content list. This type of functionality could be used in conjunction with technology which automatically determines the song that is playing on the radio.

Integration, Management and Playback Content. Once the content is found, the agent(s) could transfer it to a central location. This could be done using any one of a number of suitable Internet protocols. The custom content could then be played back at the users home, or car or wherever it was desired. It could be used to make custom tape recordings, or used to press CDs, either in red-book audio format or by using any compression technique such as MP3. It could also be downloaded to a portable music device such as a portable MP3 player. The content could be downloaded in a random fashion. The content could be broadcast locally around the consumers house using low-power transmission. This would allow the user to listen to the content anywhere in their home using standard FM radios. This type of a system (agent-playback), essentially creates a custom station which plays the content that the users specifies. This is an improvement over existing "preference based" stations such as Launch.com (www.launch.com) and Mongo Music (www.mongomusic.com). These web destinations allow the user to specify styles of music, as well as artists, and albums that they like. Based on this, they play music that is suggested by the users preferences. Due to broadcasting regulations, they are prohibited from playing specific music. The 'custom station' functionality supported by the agent-playback system provides an enhanced experience.

Hardware Embodiments. Agents can be implemented in a number of different embodiments. Some examples include: computer software program; standalone device; internet appliance; integration in cellular phones; integration in portable music players such as portable MP3 players; integration in home stereos; integration in car stereos; integration in PDAs; and integration in pocket PCs.

User Notification When Content Is Found. When an agent finds content that the user specified, it could notify the user in a number of ways, such as: audible alarm; sending an email; call on the telephone; send a SMS (short message service) message; or page the user. Once the user is notified, they could then be given the option of buying the content. Additionally, they could also be offered the ability to ask for more information, or be presented with other similar artists that they might like to request their agent to look for.

Automatic Identification of Radio Stations. The goal of this technology is to allow a user to quickly and easily determine what is playing on a certain radio station at a certain time. The primary motivation for this is to be able to provide a 'buy-button' on a radio. This buy-button would allows the user to immediately purchase a song that they are hearing, or heard on the radio. Alternatively, the user could request more information about a song, such as the album, the name, or the artist. This information could be sent back to them as an email that they could read later, or immediately sent to a wireless device. Alternatively, this functionality could be used to allow the user to automatically update their requested song request list for their agent(s) so that they will automatically add the currently playing song to their list of requested content.

Station recognition using audio pattern recognition. One method would be to use pattern recognition techniques. A portable device could capture a segment of an audio broadcast. This segment could either be saved for future analysis, sent to a server, or analyzed locally. If it was analyzed locally, important features could be extracted from the data. Examples of 'features' would be spectral data, signal statistics, rhythm, tonality, etc. These features could then either be saved, or sent to the server in real-time. The benefit of extracting features is that the amount of data that either needs to be saved or transferred would be reduced. In addition to the actual data or features, the system requires the time at which the audio was captured, and the geographical region. Once the data/features were sent to a server, it would perform pattern recognition to determine which radio station the data matched with. This pattern recognition could use any of a number of modern techniques such as statistical pattern recognition, neural networks or fuzzy logic. The server would be constantly recording/buffering the audio from the broadcasts from the stations in the geographical region of interest. These data sets would be matched against the data recorded by the client. Additionally, other methods would be used to record the names of the songs played on the stations (most stations make this information available).

Station recognition using masked spread spectrum carrier. Another method is to insert a data signal into the actual radio broadcast signal. This data signal could either be in-band or out-of-band data. In the case of in-band data, the data signal would be a spread spectrum pseudo-random noise sequence. This sequence would be spectrally modified to be masked by the audio. Each station would have a separate code which would uniquely identify it. Once identified, the time would then be used to determine the specific song that was played.

Automatic Editing of Broadcast Content. The goal of this technology is to provide a service where broadcasts could be recorded, and then automatically edited on a personalized basis. For example, a user might want to record a world series baseball game, but actually only want the highlights, or possibly only plays where there was a hit, or innings where there was a run. There could be a number of different types criteria for recording. In order to facilitate this, edit-decision data would be generated (either in real-time, or off-line). This data could either be generated by the broadcaster themselves, or by a third party. This edit-decision data would denote specific times, defining the start and end of events (such as innings, plays with hits, etc.). The client could then record the entire game, and then an automatic editing algorithm would use the personalized edit-decision for the individual user to edit the audio, providing automatic fade-in/fade-out of the audio. The embodiment would include both an authoring system that would allow for the generation of the edit-decision markers as well as client. The authoring system provides the metadata with markers denoting the beginning and end of different types of events. The client could either record the entire broadcast, and then automatically edit the data. Alternatively, the client could edit the data in real-time as the meta-data markers arrive.

'Smart Record' Button. This button would allow a user to press record, and record either a piece of music or a TV show even if the show had already started. To accomplish this, the recorder device would start buffering at the beginning of a song. If the button was hit at any time during the song, it would save the data. If not, it would delete it.

Figure 11:
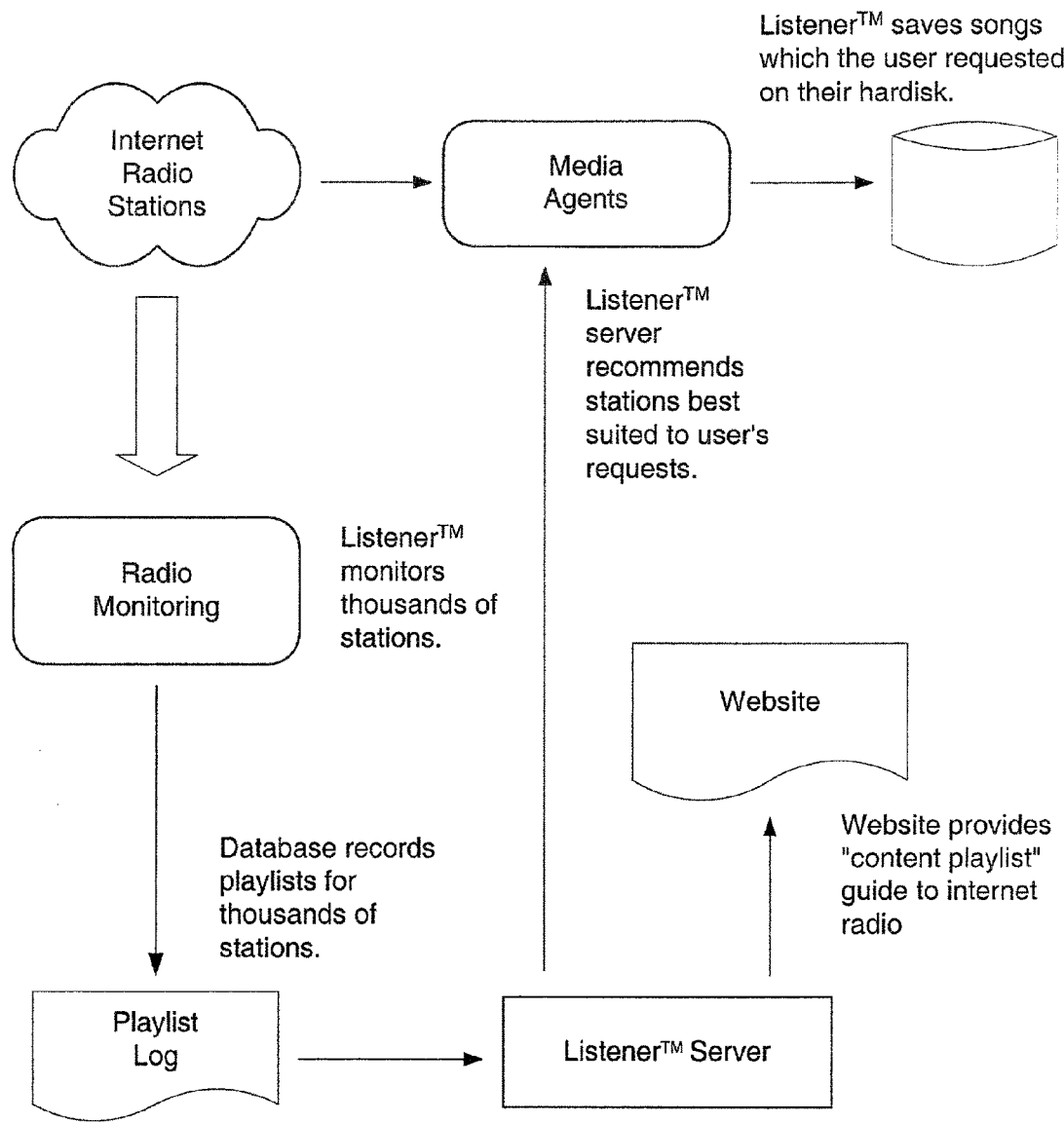
FIG. 11 shows a conceptual diagram of a system for locating and capturing media content from broadcast stations in accordance with a preferred embodiment.

Conceptual Review. FIG. 11 is a conceptual overview of the end-to-end architecture of the Listener™ system. The heart of the Listener™ infrastructure is proprietary technology designed to monitor a large number of Internet radio stations. This system "listens" to each radio station and keeps track of each song that was played. This information is then saved in a central database. By monitoring a large number of Internet radio stations and compiling playlist information it is possible to make recommendations for stations based upon a persons specific requests or musical tastes. For example, if someone is interested in recording songs from Fiona Apple, the Listener™ server could provide a list of the top 20 stations that would be most likely to play her songs. The server also supports other queries such as specific songs and albums, as well as more complex queries which might include a list of artists songs and albums.

The Listener™ personal media agent is responsible for listening for, and recording the content that the user requested. In order to do this, it first queries the Listener™ server which in turn gives it a ranked list of stations that would be most likely to record the songs, artist or albums that the user requested. The media agent does this by monitoring a number of stations simultaneously. For example, using proprietary technology a single media agent is able to monitor over 20 different radio broadcasts on a 512K DSL line. Once the agent finds a song that matches the users criteria, the agent will then save it to the hard disk.

Phase 1: Stand-alone application. A first phase of implementation is a stand-alone computer application. The main screen displays the radio stations that the Listener™ is currently monitoring. When as song that matches the users criteria is found, the Listener™ records it and adds it to either their music collection or custom radio station playlist.

Phase 2: Distributed Agents and Integration with portable devices. In a second phase of implementation, the system will support multiple, distributed personal media agents. This enables the user to use multiple computers to record their content. The operation of these distributed agents will be coordinated and the resulting content will be transferred to a single location and integrated into their music collection or personal radio station. Additionally, the users will be able to program, control and check status of their media agents using a number of portable devices. For example, if the user heard a song that they liked on the radio, they could use their web-enabled phone to add the song or artist to their personal wish list. Their personal agents would then begin searching for this new content.

Phase 3: Integration with consumer appliances. In this phase, the Listener™ media agents will be integrated into consumer appliances. For example, a device similar to current consumer electronics devices could be used to automatically record and subsequently playback artists and songs that the user requested. In this phase, following the model created by TiVo®, the Audio Mill will pursue the licensing of the Listener™ technology to consumer electronics manufacturers.

Revenue Opportunities. Several Revenue opportunities exist for The Listener™ and its associated technology. These include: software sales; targeted marketing; advertising revenue; technology licensing; commerce; ASCAP/BMI reporting; and licensing of the client functionality.

Software Sales. The basic Listener™ application will be available as a free download. A "premier" or "gold" version will be offered for sale at a nominal price. This will offer enhanced functionality and services such as email notification and higher quality audio.

Targeted Marketing. By keeping a database of its users, the Listener™ naturally compiles a history of all the of the songs requested by a user. This information can then be used to establish focused direct marketing to its user base. Either through partnerships or by internal development, the Listener™ could offer services that both provide value to the customer as well as offer lucrative focused marketing opportunities. Examples include a personalized information service which would alert its users to concerts and promotions for artists that the user has requested.

Advertising. The Listener™ presents several opportunities to sell advertising internal to the application. In addition to standard website banner advertisements, the Listener™ offers placement inside the application in the form of music recommendations. For example, the user could be presented with the opportunity to "Always record MTV's Top 10." This page is completely dynamic, and its content is downloaded from the server. This allows these selections to change and be updated on a regular basis, allowing for new feature selections to be added at will. In addition to selling real estate in the application in the form of recommendations, The Listener™ is also going to pursue website advertising as well. To complement its personal media agent, the Listener™ website will also serve as a unique and compelling destination site. The playlist information that is collected will allow the site to create a "content-based guide" to Internet broadcasting. This is a unique offering in the field of current radio portals that simply provide radio stations organized by genre. In contrast, a content based guide allows the user to find radio stations which play exactly what the user desires.

Licensing. Licensing is another revenue opportunity. Recently, a number of Internet audio appliances such as Kerbango have become available. Typically these Internet audio devices allow the user to "tune" to a large number of Internet radio stations. The problem with this model is that there are a huge number of stations making it difficult to navigate the vast amounts of available information and stations from an appliance. The Listener™ becomes a method to automatically gather content based upon a users musical tastes.

Commerce. The Listener™ will provide click-through to both informational as well as commerce partners. In return, The Listener™ will receive a royalty based on the number of sales.

Statistics Gathering. As part of its infrastructure, The Listener™ will be accumulating complete playlist records on a huge number of Internet broadcasters. This information in and of itself is valuable, and could be used in several ways to generate revenue, such as by reporting to ASCAP or music survey organizations.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

The invention claimed is:

1. A method for a media agent to monitor multiple broadcast transmissions, each broadcast transmission containing media content, comprising:

identifying the broadcast transmission to be monitored;

establishing connections with the identified broadcast transmissions identifying, for each connected broadcast transmission, at least one characteristic of the media content associated with the connected broadcast transmission through a statistical pattern recognition scheme, without the need for the media content to include a unique identifier that is derived from, inserted or embedded in the media content; and maintaining the association between the identified at least one characteristic of the media content and the connected broadcast transmission.

2. The method of claim 1, wherein the broadcast transmissions are composed of streaming audio data.

3. The method of claim 1, wherein the statistical pattern recognition scheme is accomplished through an historical analysis of the media content associated with the connected broadcast transmission.

4. The method of claim 1, wherein the step of identifying the at least one characteristic of the media content associated with each connected broadcast transmission is accomplished with metadata.

5. The method of claim 1, wherein the statistical pattern recognition scheme uses extracted features from the media content to reduce the amount of data needed to analyze the media content.

6. The method of claim 5, wherein the extracted features include spectral data, signal statistics, rhythm, and/or tonality.

7. The method of claim 5, wherein the extracted features are saved for future analysis by the media agent.

8. The method of claim 5, wherein the extracted features are sent by the media agent to a server for analysis.

9. The method of claim 5, wherein the extracted features are analyzed locally by the media agent.

* * * * *